United States Patent

Askew

[15] 3,691,400

[45] Sept. 12, 1972

[54] UNIJUNCTION TRANSISTOR ARTIFICIAL NEURON

[72] Inventor: William J. Askew, Arlington, Tex.

[73] Assignee: LTV Aerospace Corporation, Dallas, Tex.

[22] Filed: Dec. 13, 1967

[21] Appl. No.: 690,357

[52] U.S. Cl. ....................307/201, 307/283, 307/301

[51] Int. Cl. ............................................H03k 19/08

[58] Field of Search...............307/201, 211, 283, 301

[56] References Cited

UNITED STATES PATENTS

| | | | |
|---|---|---|---|
| 3,097,349 | 7/1963 | Putzrath et al. | .........340/172.5 |
| 3,126,516 | 3/1964 | Peaslee | ..................307/283 X |
| 3,284,080 | 11/1966 | Jones | .....................307/301 X |
| 3,284,788 | 11/1966 | Hudson | ..................307/301 X |
| 3,315,246 | 4/1967 | Huffman et al. | ........307/301 X |

OTHER PUBLICATIONS

" Electronics" , page 106, dated June 14, 1965

" Heater Control CKT For Both Fast and Proportional Control" by Baslock in IBM Tech Disclosure Bulletin, vol. 8, No. 11, dated April 1966 - pages 1694- 1695

" Nanoampere Sensing Circuit with 100 Megohm Input Impedance" GE Transistor Design Package, Vol. 3, Folio 1 dated Feb. 1963.

Pub I. " Artifical Neurons - For Machines That Learn" by Moraff in Electronic Industries, Dec. 1963, pages 52 to 56

*Primary Examiner*—Stanley D. Miller, Jr.

*Attorney*—H. C. Goldwire and Charles W. McHugh

[57] ABSTRACT

A circuit capable of large ranges of pulse rates and pulse widths and comprising a unijunction transistor having one base connected to a d-c source and the other base connected to ground through a resistor. An RC circuit consists of a second resistor and a capacitor connected between the d-c source and ground to determine pulse rate. A diode connects the junction between the second resistor and the capacitor to the emitter electrode to provide a discharge path for the capacitor through the transistor and the first resistor to ground to determine pulse width. A third resistor connects the d-c source to the emitter to bias the transistor to near its firing threshold. Input signal means supply an input signal to said junction to vary pulse rate.

1 Claim, 2 Drawing Figures

Figure 1:
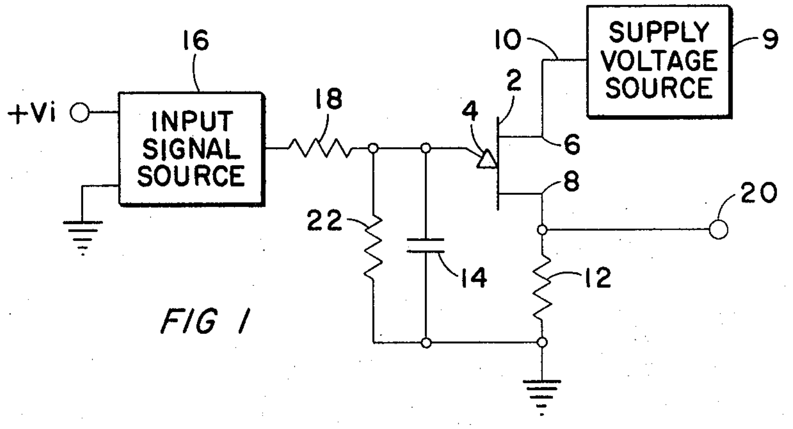

WILLIAM J. ASKEW
INVENTOR
BY Robert M. Sperry
ATTORNEY

UNIJUNCTION TRANSISTOR ARTIFICIAL NEURON

This invention relates to artificial neurons and is particularly directed to simple electronic circuits employing unijunction transistors in modified relaxation oscillator configurations to simulate the functions of neurons of the brain and central nervous system of animals.

Attempts to simulate the human brain or nervous system have been made repeatedly throughout almost the entire history of man. However, as biological knowledge of the brain and nervous system has increased, the problems of attempted simulations have increased factorially. Hence, in recent years, the attempted simulations have resulted in extremely complex electronic devices which have been capable of relatively limited simulation. The complexity arises, in part, because any given neuron in the human system may receive input signals from one or a plurality of presynaptic neurons or sensors; and these input signals may be either analog or digital, excitatory or inhibitory, or any combination of these. The neuron reacts by emitting pulse-type signals at magnitudes and repetition rates determined primarily by the net effect of the input signals. To meet these requirements, one prior art simulation attempt has employed a linear programming technique for use on a digital computer. However, this process becomes unbelievably complicated for a three-input system, whereas the human brain has neurons receiving over a hundred inputs. Another attempt employs an analog computer technique which uses three operational amplifiers per neuron. Unfortunately, this would use up the capacity of even a large computer while attaining only limited flexibility. Thus, although each of the prior art attempts at neuron simulation have been of value, none has been entirely satisfactory.

These disadvantages of the prior art are overcome with the present invention and an electronic circuit is provided which is extremely simple, compact, and inexpensive; yet which satisfies substantially all of the known requirements for neuron simulation and permits simulation of neural networks of vastly greater flexiblity than has been possible heretofore.

The advantages of the present invention are preferably attained by employing a unijunction transistor in a modified relaxation oscillator circuit having substantially any desired number and combination of types of inputs connected directly to the emitter of the transistor.

Accordingly, it is an object of the present invention to provide an improved artificial neuron.

Another object of the present invention is to provide an electronic circuit which is simple, compact, and inexpensive; yet which satisfies substantially all the known requirements for neuron simulation.

An additional object of the present invention is to provide an artificial neuron which permits simulation of neural networks of vastly greater flexibility than has been possible heretofore.

A further object of the present invention is to provide an artificial neuron which is capable of actuation by substantially any desired number and combination of types of input signals.

A specific object of the present invention is to provide an artificial neuron comprising a unijunction transistor in a modified relaxation oscillator circuit having substantially any desired number and combination of types of signal inputs connected directly to the emitter of the transistor.

These and other objects and features of the present invention will be apparent from the following detailed description taken with reference to the figures of the accompanying drawing.

Figure 2:
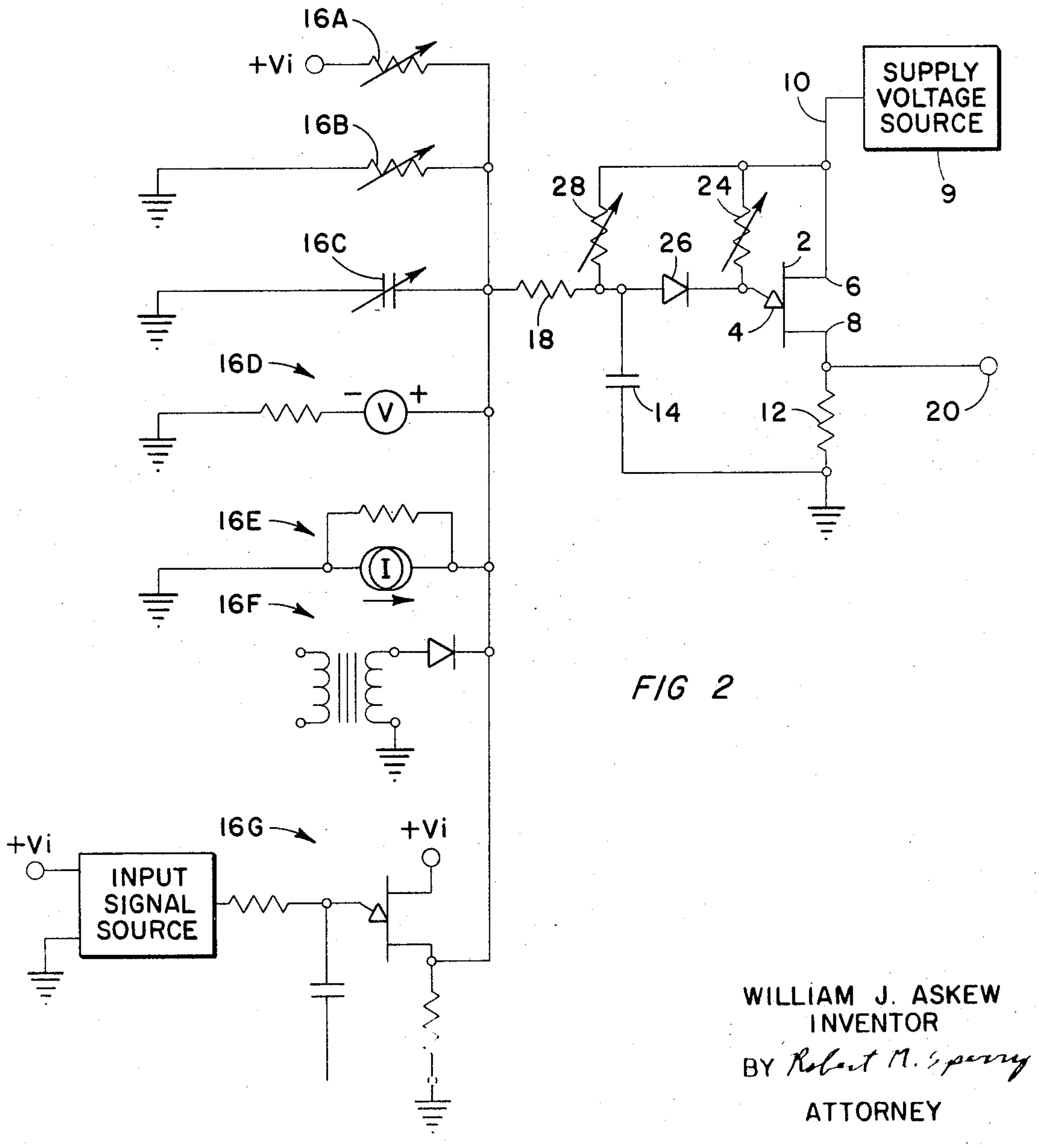

In the drawing:

FIG. 1 is a circuit diagram of an artificial neuron circuit embodying the present invention; and FIG. 2 is a circuit diagram of a modified form of the artificial neuron circuit of FIG. 1.

In that form of the invention chosen for purposes of illustration In FIG. 1, a unijunction transistor 2, having an emitter electrode 4 and two base electrodes 6 and 8, connected in a modified relaxation oscillator circuit. Supply voltage from a suitable source is applied through conductor 10 to base electrode 6 of the transistor 2, while base electrode 8 of transistor 2 is connected through resistor 12 to ground. A capacitor 14 is connected between the emitter electrode 4 of transistor 2 and ground, while input signals from a suitable source 16 are applied through resistor 18 to capacitor 14 and emitter electrode 4. The output of the circuit is taken from base electrode 8 of transistor 2 through conductor 20. Resistor 22 is a leakage resistor and may be omitted when leakage paths exist in the input signal source 16. Moreover, where the impedence of source 16 is sufficient, resistor 18 may be omitted.

In operation, unijunction transistor 2 is reversely biased by the supply voltage applied through conductor 10 and base electrode 6. The input signal source 16 applies signals to the emitter electrode 4 of unijunction transistor 2. The signals supplied by source 16 may be of either positive or negative polarity and may be either analog or digital signals. Transistor 2 will not conduct so long as the magnitude of the input signals from source 16 is less than a fixed threshold value which is a known function of the reverse biasing voltage applied to base electrode 6. The known function is referred to as the "intrinsic stand-off ratio" of the transistor and is determined by the geometry of the unijunction transistor 2. Typically, the intrinsic stand-off ratio has a value of about 0.60. If the magnitude of the input signals from source 16 exceeds the threshold value, transistor 2 "fires" and the resistance between the emitter electrode 4 and base electrode 8 falls from about 2,000–3,000 ohms to about 40–100 ohms in a negative-dynamic-resistance manner. This causes a rapid discharge of capacitor 14 through transistor 2 and resistor 12 and causes an output pulse to appear on output conductor 20. When the voltage across capacitor 14 falls below about one volt, transistor 2 "turns off" and becomes reversely biased once more; while the magnitude of the signal appearing on the emitter electrode 4 of transistor 2 begins to rise toward the value of source 16, at a rate determined by the values of capacitor 14 and resistor 18, until the threshold is exceeded again and transistor 2 "fires" once more. If the magnitude of the input signal from source 16 remains above the threshold value of transistor 2, transistor 2 will apply a series of output pulses to output conductor 20 at a repetition rate which is determined by the values of the supply voltage, the input signal voltage, capacitor 14, resistor 18, and the intrinsic stand-off ratio of transistor 2. Thus, if input signal source 16 emits an analog signal of the same polarity as the supply voltage applied to base electrode 6, unijunction transistor 2 will apply a series of evenly spaced pulses to output conductor 20 whenever, and for as long as, the magnitude of the signal from source 16 exceeds the threshold value. Moreover, if input signal source 16 emits digital signals of the same polarity as the supply voltage and having magnitudes greater than the threshold value, unijunction transistor 2 will apply a single pulse to output conductor 20 for each pulse received from input source 16. If input signal source 16 emits an analog signal having a polarity opposite to that of the supply voltage applied to base electrode 6, suitable means, such as a battery, may be connected to the emitter electrode 4 of transistor 2 to normally bias the input signal from source 16 above the threshold value. Under these circumstances, transistor 2 will apply a continuous series of evenly spaced pulses to output conductor 20. However, this series of pulses will be broken when, and for as long as, the magnitude of the analog signal from input signal source 16 forces the voltage at emitter electrode 4 below the threshold value. Similar biasing means may be employed where the input signal source 16 emits digital signals having a polarity opposite to that of the supply voltage. With this arrangement, transistor 2 normally generates a series of uniformly spaced pulses, as described above. However, the application of a pulse from input signal source 16 to the emitter electrode 4 of transistor 2 serves to decrease the potential across capacitor 14. Consequently, additional time is required for the biasing source to raise the voltage across capacitor 14 to a value above the threshold value of transistor 2 with the result that the "firing" of transistor 2 is delayed and the time interval between successive pulses appearing on output conductor 20 will be greater than between successive pulses of the uniformly spaced series. It will be seen from this that the information carried by the digital signals applied by input signal source 16 to emitter electrode 4 of transistor 2 will appear on the output conductor 20 as variations in the pulse spacing. Thus, as noted above, the signals from input signal source 16 may be analog or digital and may be of either polarity.

It is found in neural biology that the presynaptic signals applied to a synaptic nerve cell may be either excitatory or inhibitory and may be either analog or digital, whereas the output of a synaptic nerve cell is always digital. Analogously, it will be seen that, in the foregoing discussion, the signals from input signal source 16 may be either analog or digital and those signals which are of the same polarity as the biasing voltage applied to base electrode 6 of transistor 2 correspond to excitatory inputs; while those of opposite polarity correspond to inhibitory inputs. Moreover, the output signal of transistor 2, appearing on output conductor 20, are always digital. It will be apparent from this that the input signal source 16 may be a sensor unit, such as a transducer, which establishes electrical signals indicative of pressure, temperature, light, sound, or other appropriate phenomena. Alternatively, the output conductor 20 of one artificial neuron circuit may be connected to the emitter electrode 4 of one or more subsequent artificial neuron circuits to simulate a neural network, as seen at 16G in FIG. 2. Obviously, other types of input signal sources may also be employed. Moreover, as illustrated at 16A to 16F in FIG. 2, it is contemplated that the input applied to the emitter electrode 4 may be the net result of the signals from a plurality of input sources; which may be either analog or digital, inhibitory or excitatory, or any combination thereof. Thus, signal source 16A represents a variable resistance connected between a voltage source $V_i$ and resistor 18, signal source 16B represents a variable resistance connected between resistor 18 and ground, and signal source 16C represents a variable capacitance connected between resistor 18 and ground. It will be obvious that most conventional transducers would represent signal sources corresponding to either 16A, 16B, or 16C. Signal source 16D represents substantially any Thevenin equivalent source, while signal source 16E represents substantially any Norton equivalent source. Signal source 16F represents substantially any transformer coupled source. Finally, signal source 16G represents a circuit, such as that of FIG. 1, connected to function as a presynaptic neuron for the artificial neuron of FIG. 2. The number of input sources which may be connected to the emitter electrode of a given artificial neuron circuit is virtually unlimited, as is the number of sources to which the output pulses of the given artificial neuron circuit may be supplied.

FIG. 2 illustrates a modified form of the artificial neuron circuit of FIG. 1. This form of the invention corresponds to what, in neural terminology, are called "pace-maker" cells. These cells fire spontaneously, without requiring presynaptic inputs, although presynaptic inputs are sometimes applied. When this occurs, the presynaptic inputs serve to vary the frequency of the output signals emitted by the pacemaker cells. Thus, in FIG. 2, a resistor 24, which may be adjustable, is connected between conductor 10 and the emitter electrode 4 of transistor 2 and a diode 26 is connected between capacitor 14 and the junction between resistor 24 and the emitter electrode 4. The value of resistor 24 is selected or adjusted to bias transistor 2 substantially at its threshold value, while diode 26 serves to block the biasing voltage from capacitor 14. The closer transistor 2 is biased to the threshold value, the more sensitive the circuit becomes to presynaptic signals, as from input signal source 16 of FIG. 1. In practice, it has been found that, with such biasing, transistor 2 can be fired by presynaptic input signals as small as 40 nanoamperes. To cause spontaneous firing of transistor 2, in simulation of pacemaker neurons, a second resistor 28, which may also be adjustable, is connected between conductor 10 and the junction between capacitor 14 and diode 26. With this arrangement, current from the supply source is applied through conductor 10 and resistor 28 to capacitor 14. When capacitor 14 has accumulated a charge equal to the threshold value of transistor 2, the charge is applied through diode 26 to the emitter electrode 4 of transistor 2, causing transistor 2 to fire and establishing a pulse on output conductor 20. It will be seen that this firing occurs spontaneously; that is, without the necessity of a presynaptic input signal. By appropriately selecting or adjusting the value of resistor 28 or capacitor 14, the repetition rate or frequency of the spontaneous firing may be controlled substantially as desired. At the same time, it will be apparent that application of a presynaptic input signal to the emitter electrode 4 of transistor 2 from one or more of the input signal sources 16A through 16F will serve to vary the frequency of the firing of transistor 2. Thus, the circuit of FIG. 2 simulates the operation of the pacemaker neurons.

It will be seen that the circuit of the present invention may be made to oscillate, digitally integrate, act as a threshold device, multiply, fire spontaneously, etc., all in analogy to biological neuron behavior. Moreover, the circuit of the present invention may receive input signals from sensors, such as transducers, measuring devices, or the like, from other similar circuits serving as presynaptic neurons, or from substantially any other source. In addition, a plurality of circuits of the type of the present invention may be connected into networks simulating biological neural networks. Furthermore, if desired, the components of the circuit of the present invention may be produced by diffusion or integrated circuit techniques to permit mass production.

Numerous variations and modifications may, obviously, be made without departing from the present invention. Accordingly, it should be clearly understood that the forms of the present invention described above and shown in the figures of the accompany drawing are illustrative only and are not intended to limit the scope of the invention.

What is claimed is;

1. An electronic circuit comprising:

a unijunction transistor having first and second base electrodes and an emitter electrode;

a source of supply voltage connected to said first base electrode to reversely bias said transistor;

first resistive means connecting said second base electrode to a reference potential;

second resistive means connected between said supply voltage source and said emitter electrode;

said first resistive means and said second resistive means constructed to form a circuit path to supply a biasing current through the emitter electrode to said second base junction of said transistor;

third resistive means and capacitive means connected in series arrangement between said supply voltage source and said reference potential with said capacitive means being connected to said reference potential to form a charging circuit for said capacitive means;

a diode connected between said emitter electrode and the junction between said capacitive means and said third resistive means to prevent appreciable positive current flow from said emitter electrode to said capacitive means;

input signal means connected to supply input signals to the junction between said capacitive means and said diode; and output means connected to said second base electrode.

* * * * *